United States Patent [19]
Archibald

[11] 3,726,384
[45] Apr. 10, 1973

[54] MACHINE TOOLS
[75] Inventor: Ronald L. Archibald, Bushey, England
[73] Assignee: The Lapointe Machine Tool Company Limited, Watford, England
[22] Filed: June 5, 1970
[21] Appl. No.: 43,912

[30] Foreign Application Priority Data
   Dec. 18, 1969   Great Britain.....................61,730/69

[52] U.S. Cl..................................198/25, 214/1 BC
[51] Int. Cl..............................................B65g 47/00
[58] Field of Search................................198/25, 210; 214/1 B, 1 BB, 1 BC; 193/35 A, 35 G

[56]          References Cited
         UNITED STATES PATENTS

| 2,297,898 | 10/1942 | Kohler | 198/25 X |
| 2,176,121 | 10/1939 | Bornett | 198/25 X |
| 2,986,261 | 5/1961 | Wenstrand | 198/25 X |
| 2,792,097 | 5/1957 | Remmen | 193/35 A |
| 2,988,237 | 6/1961 | Devol | 214/1 BC |

Primary Examiner—Evon C. Blunk
Assistant Examiner—Douglas D. Watts
Attorney—Roberts, Cushman & Grover

[57]          ABSTRACT

Two groups of machines, for broaching or otherwise machining the roots and tips respectively of workpieces such as turbine and compressor blades, are arranged in a single line. Each group is served by a separate free flow conveyor which carries workholders, each containing a workpiece, to each machine in turn and transfer mechanism arranged between the two groups of machines is operable to remove each workpiece from its workholder on one conveyor, rotate it through 180° and return it to a workholder on the other conveyor.

7 Claims, 8 Drawing Figures

MACHINE TOOLS

This invention relates to apparatus of the kind, hereinafter referred to as "the kind described," comprising a plurality of work stations at each of which one of a plurality of machining operations is performed upon a workpiece which is carried in a workholder to each station in turn by endless conveying means, and its object is to provide apparatus of this kind for operating upon workpieces such as turbine and compressor blades which require to be machined at both ends.

To this end, it has already been proposed to divide the work stations into two groups, one of which is arranged in a line adjacent one side of a first endless conveyor and the other of which is arranged in a line adjacent the opposite side of a second endless conveyor which is offset parallel to and overlaps the first conveyor between the groups of work stations, and to provide means located adjacent to the overlapping portions of the conveyors for transferring a partly machined workpiece from a workholder on the first conveyor to another workholder on the second conveyor.

To the same end, according to the present invention, it is now proposed to provide two groups of work stations arranged in series in a single line adjacent one side of said endless conveying means and transfer means located between the last work station in the first of said groups and the first work station in the second of said groups, for removing a workpiece from a workholder which has been conveyed past said first group of work stations, rotating it through 180° and loading it into another workholder on said conveying means for passage past said second group of work stations.

A preferred form of the invention will be described, by way of example, with reference to the accompanying drawings in which.

Figure 1:
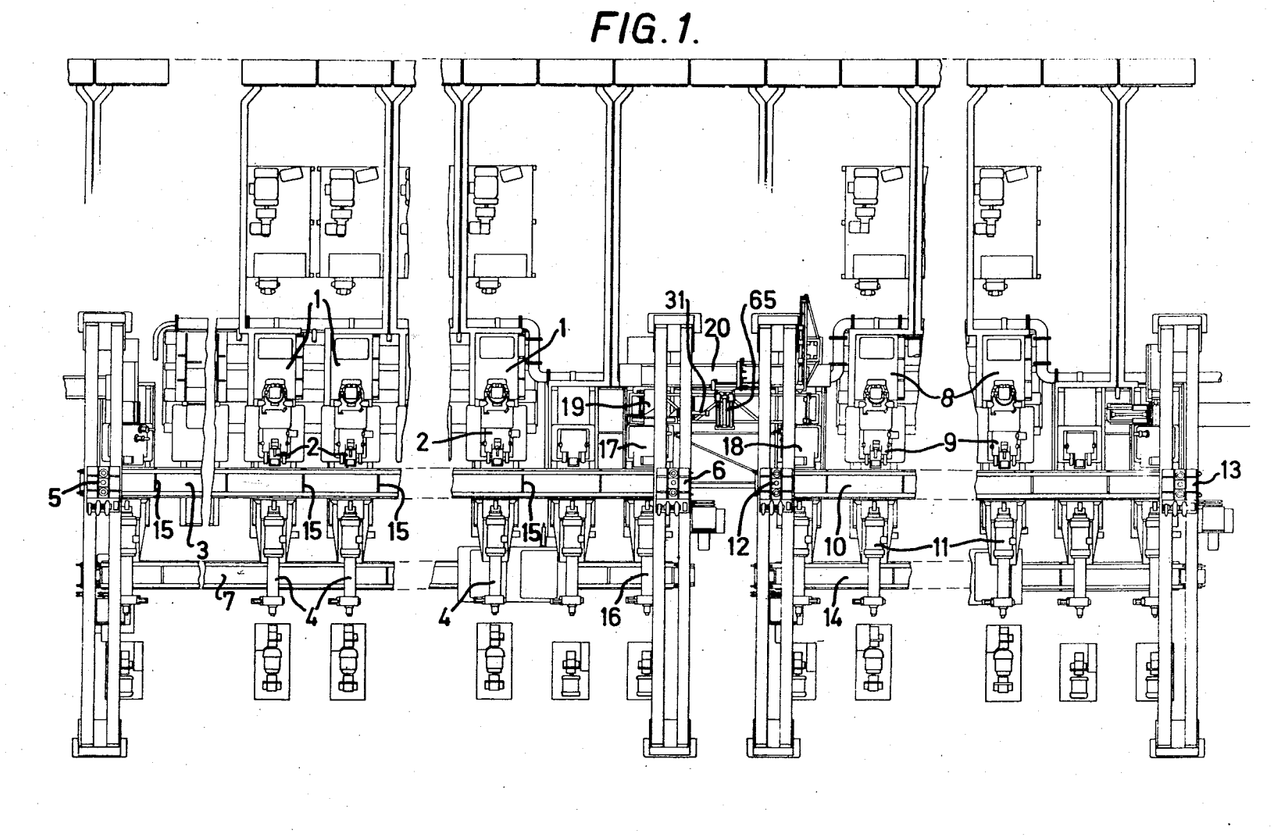
FIG. 1 is a diagrammatic plan view, with parts broken away, of a transfer line for broaching the roots and tips of aircraft engine turbine and compressor blades.
Figure 2:
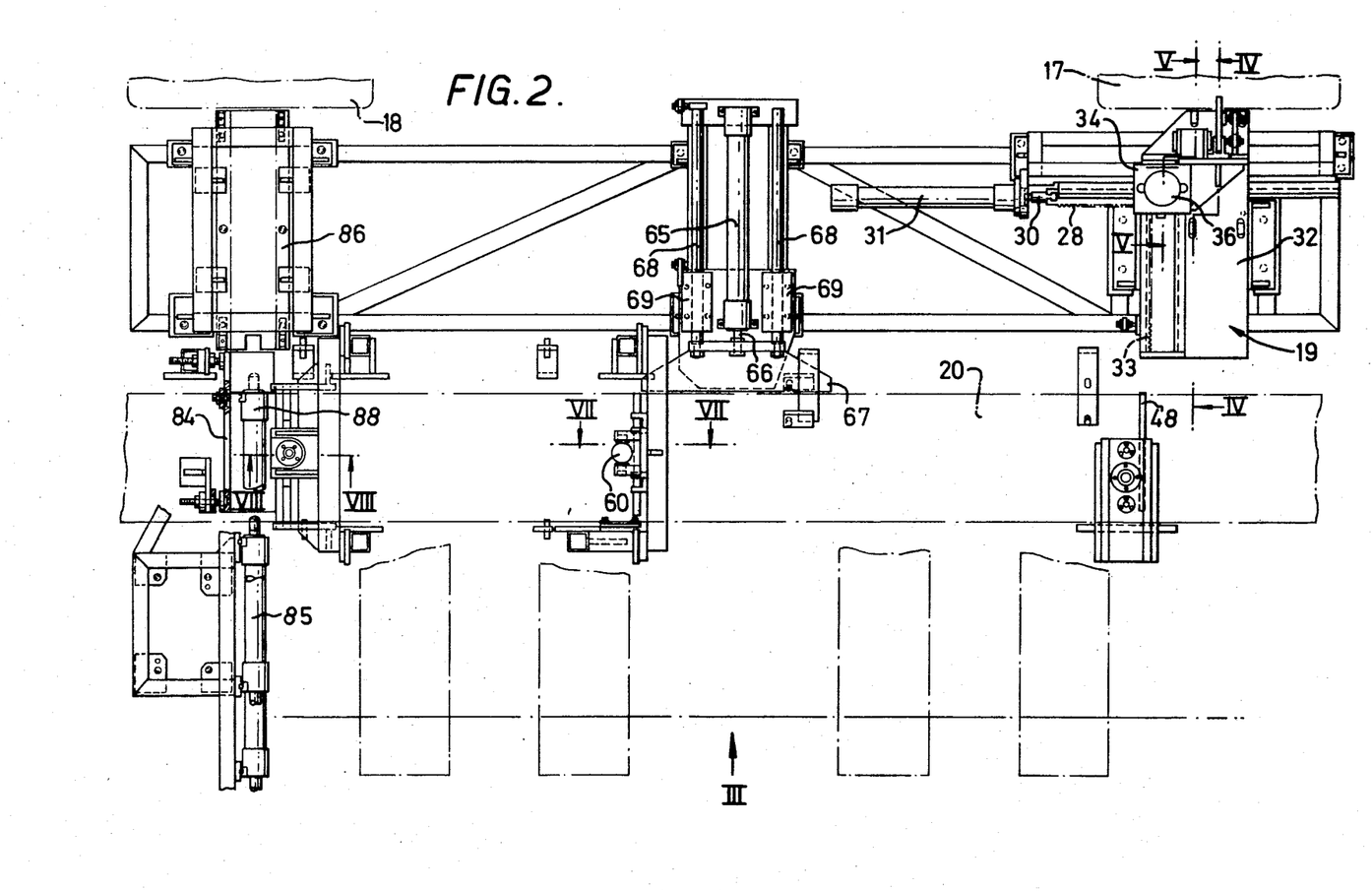
FIG. 2 is an enlarged plan view of a part of FIG. 1 showing the arrangement for transferring workpieces from a conveyor serving one group of work stations to a conveyor serving the other group of work stations.
Figure 3:
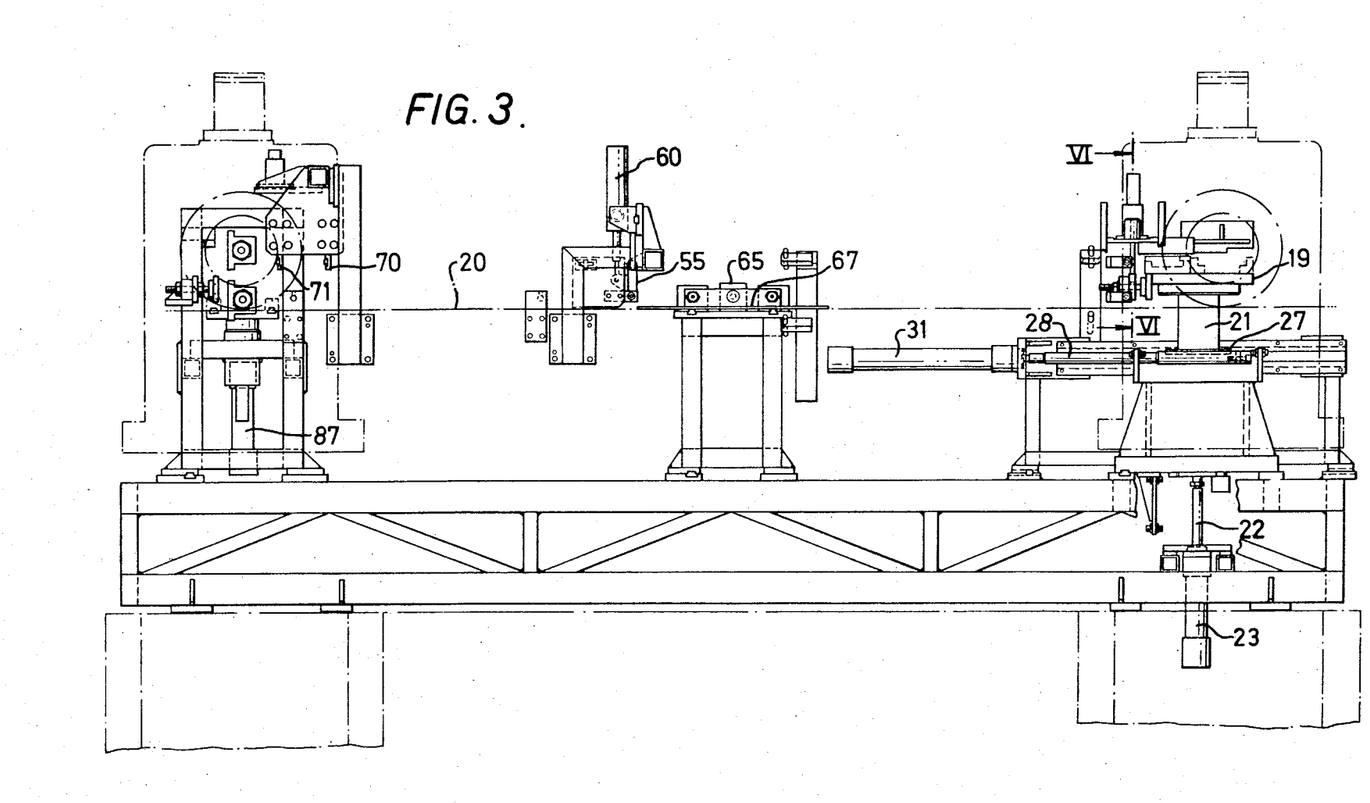
FIG. 3 is an elevation looking in the direction of the arrow III in FIG. 2.
Figure 4:
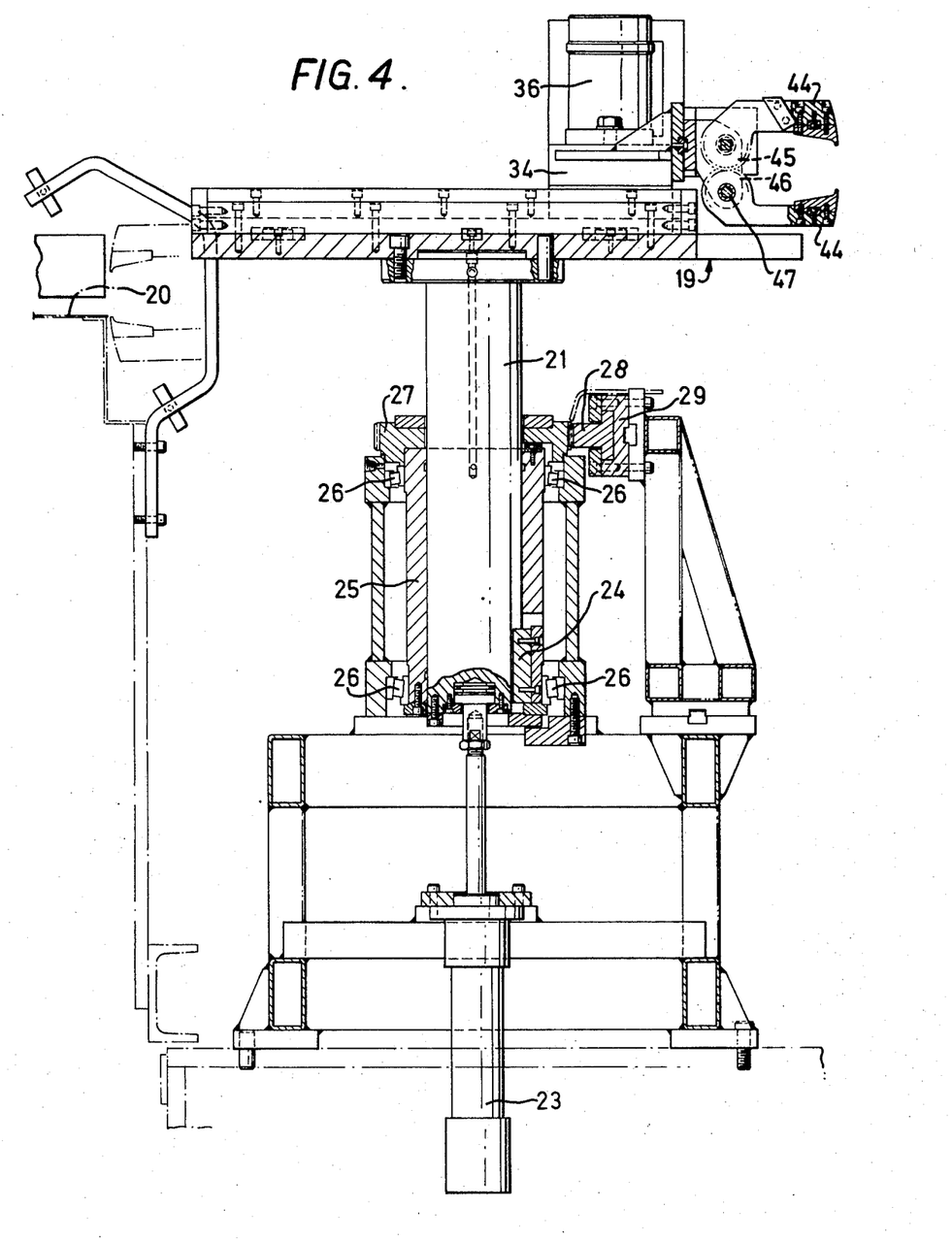
FIG. 4 is an enlarged section on the line IV—IV of FIG. 2.
Figure 5:
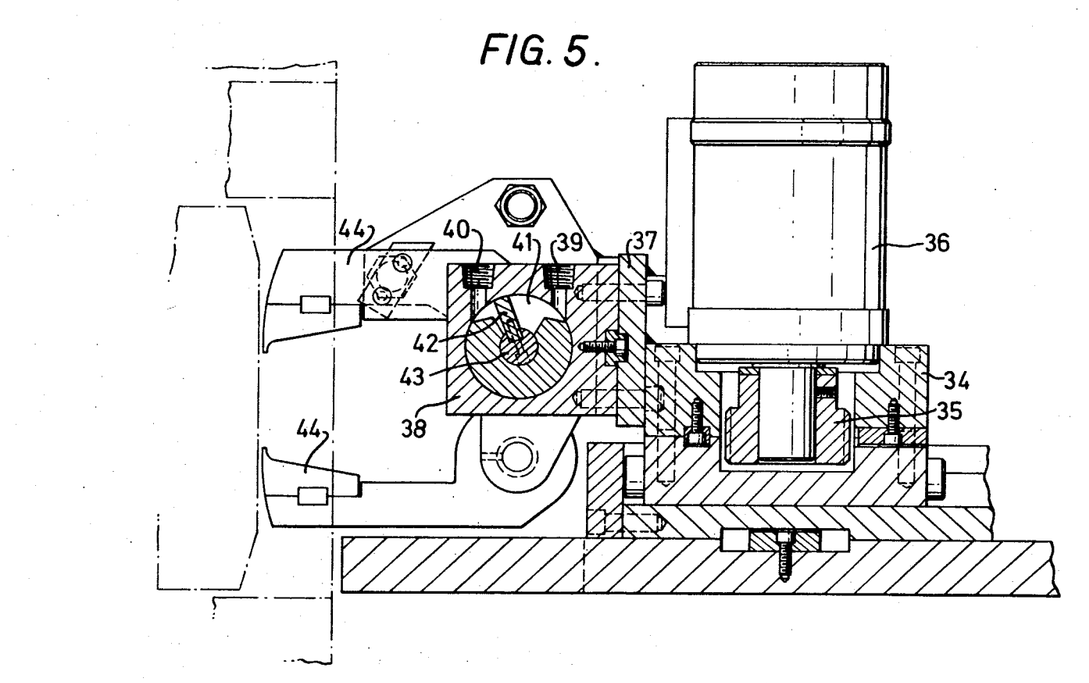
FIG. 5 is an enlarged section on the line V—V of FIG. 2.
Figure 6:
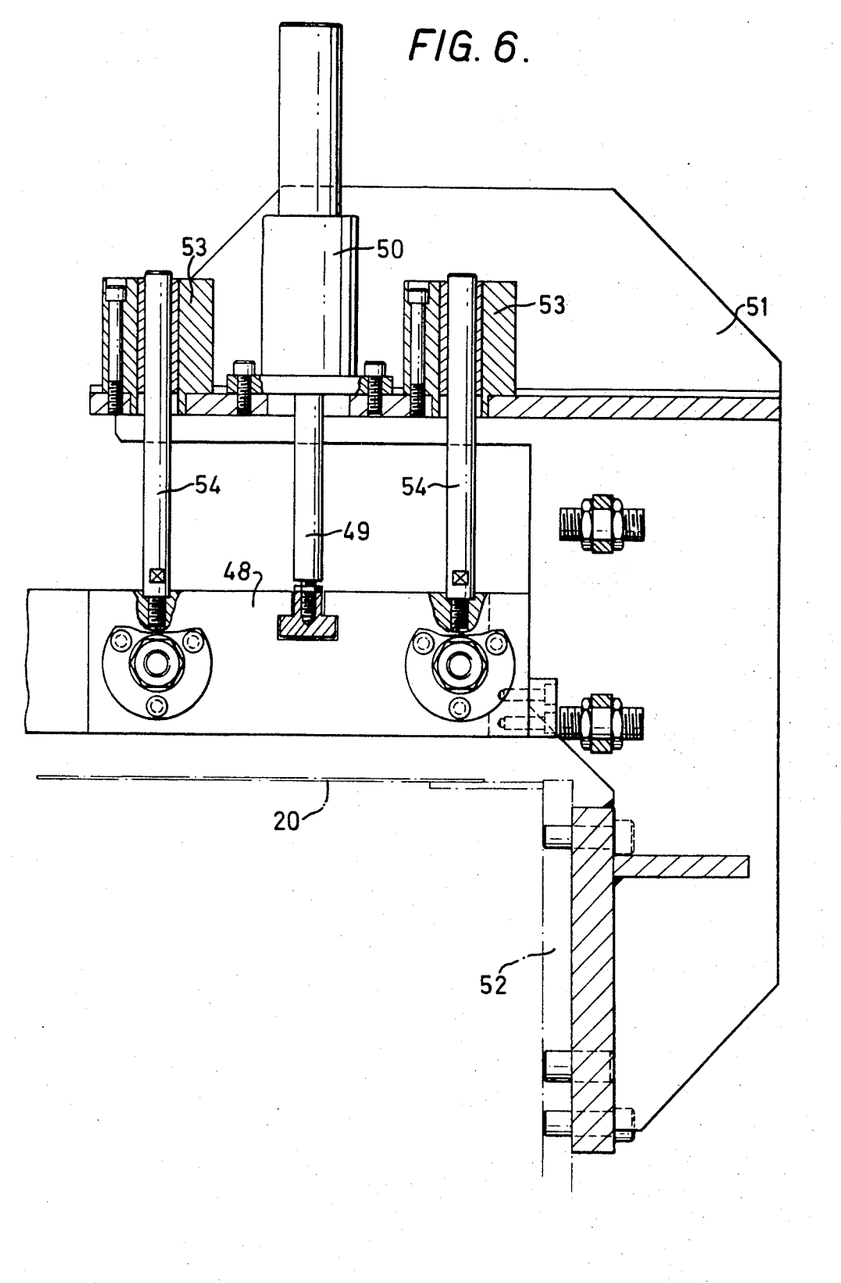
FIG. 6 is an enlarged section on the line VI—VI of FIG. 3.
Figure 7:
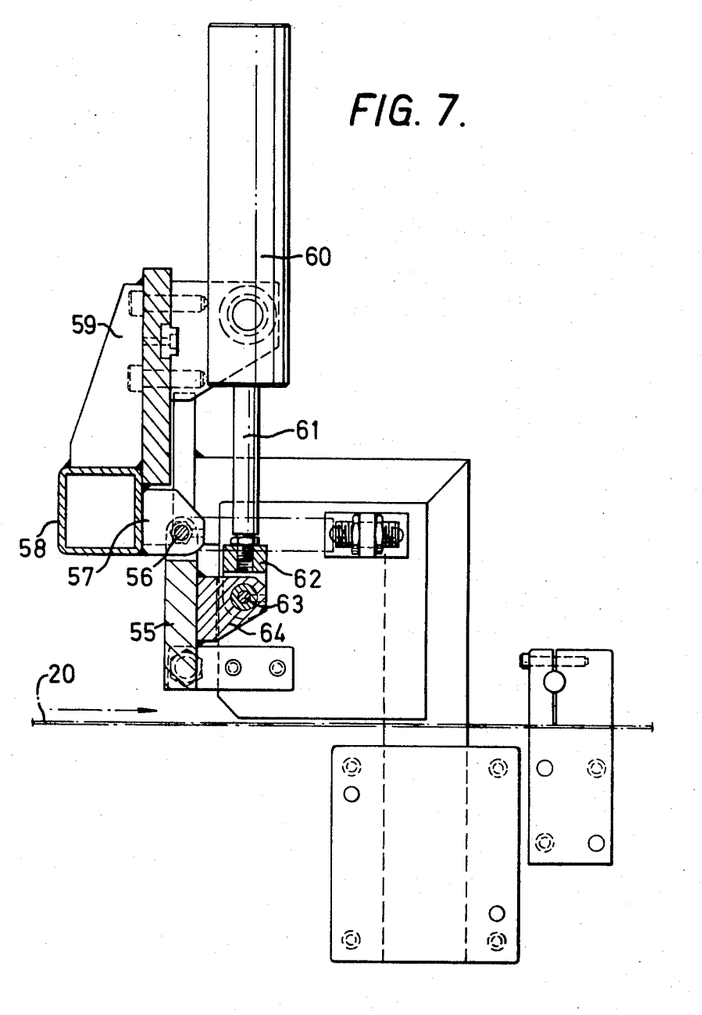
FIG. 7 is an enlarged section on the line VII—VII of FIG. 2.
Figure 8:
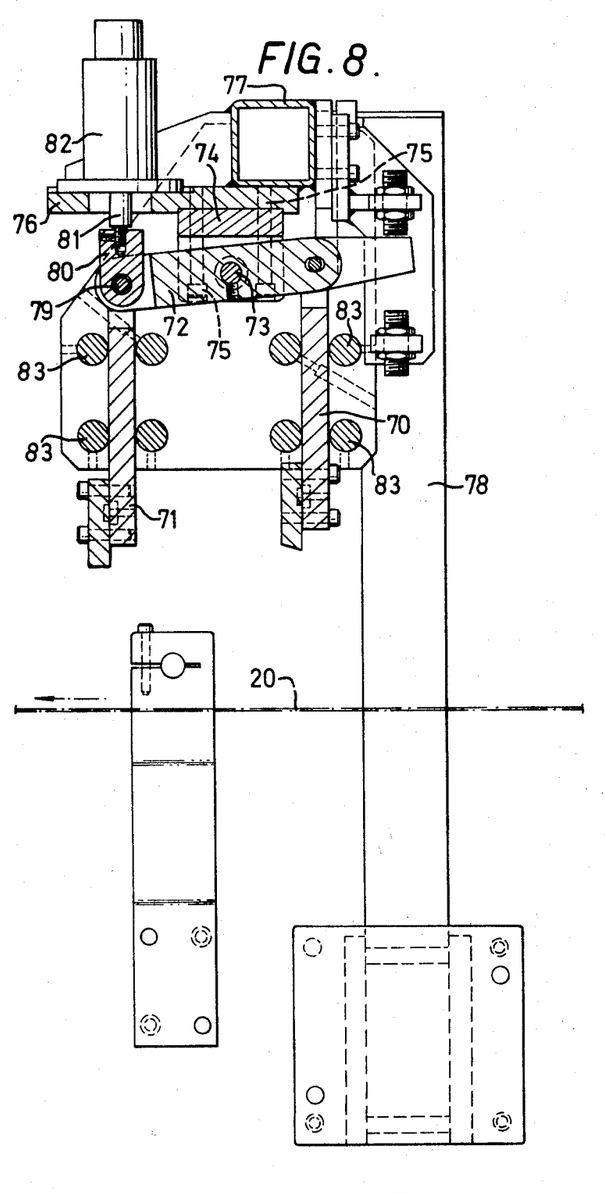
FIG. 8 is an enlarged section on the line VIII—VIII of FIG. 2.

Referring to FIG. 1, a line of vertical surface broaching machines 1 each having a work fixture 2 is arranged along one side of an endless free-flow conveyor 3, along the other side of which are arranged hydraulic rams 4 each positioned opposite one of the work fixtures. The upper run of the conveyor 3 moves from left to right as viewed in FIG. 1 and transfer means indicated diagrammatically at 5 and 6 serve to connect opposite ends of the conveyor to the ends of an endless free-flow storage conveyor 7 situated below the level of the conveyor 3. In similar fashion, a second line of vertical surface broaching machines 8, each having a work fixture 9, is arranged along one side of a second endless free-flow conveyor 10, along the other side of which are arranged hydraulic rams 11 each positioned opposite one of the work fixtures 9. The upper run of the conveyor 10 also runs from left to right, as viewed in FIG. 1, and transfer means 12 and 13 serve to connect opposite ends of the conveyor 10 to the ends of an endless free-flow storage conveyor 14 situated below the level of the conveyor 10. The conveyor 7 which moves from right to left, as viewed in FIG. 1, serves to store a plurality of workholders (not shown) and the transfer means 5 is operable to transfer a workholder from the discharge end of the conveyor 7 to the input end of the conveyor 3 where a blade (not shown), which has previously been encapsulated in a rectangular block of a stable low-melting-point alloy, is loaded into the workholder with its root end pointing towards the work fixtures, 2. One of a plurality of gates 15 arranged at intervals above the conveyor 3 serves to arrest a workholder at the input end of the conveyor while an encapsulated blade is loaded into it and the gate is then raised to permit the workholder to proceed to a point opposite the first work fixture 2 where it is again arrested by another gate 15. Associated with this gate is a limit switch which is closed by the workholder to initiate operation of the associated ram 4 to transfer the blade from the workholder into the fixture 2 with its root end presented to the first broaching machine 1. The latter is then operated to broach the blade, after which the ram 4 returns the blade to the workholder, the gate 15 is lifted and the workholder is carried to the next work station where the aforesaid operations are repeated. At one or more stations the ram 4 may be operable to rotate a blade through a predetermined angle before pushing it into the work fixture 2. When the workholder reaches the discharge end of the conveyor 3 the blade is transferred therefrom by a hydraulic ram 16 into an unload fixture 17 and the workholder is returned by the transfer means 6 to the input end of the storage conveyor 7 and is carried to the discharge end thereof for use again when required. From the unload fixture the blade is transferred to a load fixture 18 at the input end of the conveyor 10 by the means to be described hereinafter with particular reference to FIGS. 2 to 8, which means also serves to rotate the blade through 180°. At the load fixture 18 the blade is inserted in a further workholder (not shown) which has been transferred by means 12 from the conveyor 14 to the input end of the conveyor 10 and carries the blade along the line of work fixtures 9 with its tip presented for broaching at each of the machines 8 in the manner already described with reference to the first line of machines. At the discharge end of the conveyor 10 the blade is removed from the workholder, inspected and passed to a sorting mechanism (not shown) which, upon the basis of information received from the inspecting station, either rejects it or passes it to a decapsulation and cleaning unit. At the same time, transfer means 13 returns the empty workholder to the conveyor 14 where it is stored until it is required again.

On the side of the unload fixture 17 remote from the conveyor 3 is a turntable 19 which extends between the fixture 17 and the input end of an endless free-flow conveyor 20 extending parallel to and at a level lower than the conveyor 3. The turntable 19 is carried at the upper end of a pillar 21 (FIG. 3) the lower end of which is secured to the rod 22 of a hydraulic ram 23 which is operative to raise and lower the turntable between the levels of the conveyors 3 and 20. The pillar 21 is slidably mounted in and keyed at 24 (FIG. 4) for rotation with a sleeve 25 which is rotatably mounted in bearings 26 on the machine frame and is secured to a pinion 27 loosely surrounding the pillar 21 and meshing with a rack 28 slidable horizontally in a fixed guide 29 and secured at one end to the piston rod 30 (FIG. 2) of a hydraulic ram 31. The turntable 19 comprises a base portion 32 provided with a longitudinally extending rack 33 and a movable platform 34 carrying a pinion 35 (FIG. 5) meshing with the rack 33 and rotatable by a hydraulic motor 36 mounted on the platform. A bracket 37 welded to the platform 34 carries a block 38 formed with ports 39 and 40 for selective connection to an external source of hydraulic pressure fluid and opening into a chamber 41, formed in the block, on opposite sides of an oscillatory vane 42 fixed upon a shaft 43 carrying the upper one of a pair of jaws 44. The shaft 43 also carries a toothed quadrant 45 which meshes with a toothed quadrant 46 on the shaft 47 of the lower of the jaws 44.

With a blade in position in the unload fixture 17 and the turntable 19 in its raised position, pressure fluid is supplied to the motor 36 to rotate the pinion 35 which, in co-operation with the rack 33, moves the platform 34 towards the fixture 17 until the blade is between the jaws 44. Pressure fluid is then supplied through the port 39 to the right-hand side of the chamber 41 to move the vane 42 in an anti-clockwise direction as viewed in FIG. 5. Movement of the vane 42 is transmitted through the shaft 43 to the upper jaw 44 and through the quadrants 45 and 46 to the lower jaw 44 to close the jaws on the blade. The motor 36 is then rotated in the opposite direction to retract the platform 34 and draw the blade out of the fixture 17, the ram 23 is operated to lower the turntable 19 and the ram 31 is operated to move the rack 28 to the right as viewed in FIGS. 2 and 3 to rotate the turntable 19 through 180° through the medium of the pinion 27. The motor 36 is once again operated to move the jaws 44 out over the conveyor 20 and the jaws are opened to deposit the blade onto the conveyor.

Initial movement of the blade on the conveyor 20 is controlled by a gate 48 which is secured to the lower end of the piston rod 49 (FIG. 6) of a hydraulic ram 50 which is carried by a bracket 51 secured to one side of the conveyor frame 52 and provided with guides 53 for guide rods 54 on the gate. The gate 48 is lifted by the ram 50 to permit the blade to move along the conveyor 20 and is lowered again to await delivery of the next blade from the turntable 19.

The conveyor 20 passes beneath another gate 55 which is pivotally mounted on a rod 56 (FIG. 7) carried in brackets 57 welded to the cross-member 58 of a gantry carried by opposite sides of the conveyor frame. The cross-member 58 carries brackets 59 which serve to support a hydraulic ram 60 the piston rod 61 of which is secured at its lower end to a beam 62 pivotally mounted on a shaft 63 carried by brackets 64 secured to the gate 55. At one side of the conveyor 20, in front of the gate 55 in the direction of movement of the conveyor, is mounted a hydraulic ram 65 the piston rod 66 of which is secured to a plate 67 which carries rods 68 slidable in guides 69. At the side of the conveyor 20 opposite the ram 65 is arranged a buffer store (not shown) into which blades halted by the gate 55 and swept from the conveyor by the plate 67 on the ram 65 can be stored until required. Operation of the ram 60 is effective to swing the gate 55 about its pivot to enable a blade passing direct from the turntable 19 or returned from the buffer store to move farther along the conveyor 20.

The conveyor 20 passes beneath two further gates 70 and 71 pivotally suspended from an arm 72 (FIG. 8) pivoted at 73 on a bracket 74 secured by bolts 75 to a platform 76 which is welded to the lower end of a cross member 77 carried by pillars 78 secured to opposite sides of the conveyor frame. Pivotally secured at 79 to one end of the arm 72 is a short arm 80 to which is screwed the lower end of the piston rod 81 of a hydraulic ram 82 mounted on the platform 76. The ram 82 is adapted to swing the arm 72 about its pivot 73 to alternately raise and lower the gates 70 and 71 which are constrained for vertical movement by pairs of guide members 83. A blade on the conveyor 20 is halted first by the gate 70 then by the gate 71 which, upon being raised, permits the blade to proceed to an unloading point where it is finally halted by an abutment 84 associated with a limit switch which initiates operation of a hydraulic ram 85 to transfer the blade from the conveyor 20 onto a platform 86. The latter is movable vertically by a hydraulic ram 87 to transfer the blade from the level of the conveyor 20 to the level of the conveyor 10 and a further hydraulic ram 88 is operable to transfer the blade into the load fixture 18 for insertion into a workholder on the conveyor 10 with its tip pointing toward the work fixtures 9.

Operation of the various hydraulic devices is initiated by limit switches (not shown) located in the path of movement of the workholders and workpieces along the various conveyors.

I claim:

1. Apparatus for performing a series of machining operations upon one end of a workpiece followed by a further series of machining operations on the other end of the workpiece, comprising first and second groups of work stations arranged in a single line, first and second longitudinally aligned, continuously driven endless conveyors arranged alongside said first and second groups of work stations, respectively, for moving work holders past the work stations on each group, said first and second conveyors having input and discharge ends, transfer means situated between the discharge end of the first conveyor and the input end of the second conveyor comprising a continuously driven endless transfer conveyor arranged parallel to said first and second conveyors between the discharge and input ends thereof, said transfer conveyor having input and discharge ends, a turntable rotatable about a vertical axis between the discharge end of said first conveyor and the input end of said transfer conveyor for rotating said workpiece through 180°, an unload fixture interposed between the discharge end of said first conveyor and said turntable, hydraulically operated means adjacent the discharge end of said first conveyor for transferring a workpiece from its holder on said first conveyor into said unload fixture and a pair of hydraulically operated jaws on said turntable for removing a workpiece from said unload fixture and depositing it upon said transfer conveyor.

2. Apparatus for performing a series of machining operations upon one end of a workpiece followed by a further series of machining operations on the other end of the workpiece, comprising first and second groups of work stations arranged in a single line, first and second longitudinally aligned, continuously driven endless conveyors arranged alongside said first and second groups of work stations, respectively, for moving work holders past the work stations of each group, said first and second conveyors having input and discharge ends, transfer means situated between the discharge ends of the first conveyor and the input end of the second conveyor comprising a continuously driven endless transfer conveyor extending parallel to said first and second conveyors and located at a level below that of said first and second conveyors, a turntable rotatable about a vertical axis between the discharge end of the first conveyor and the input end of said transfer conveyor for rotating said workpiece through 180°, an unload fixture interposed between the discharge end of said first conveyor and said turntable, hydraulically operated means adjacent the discharge end of said first conveyor for transferring a workpiece from its holder on said first conveyor into said unload fixture, a pair of hydraulically operated jaws on said turntable for removing a workpiece from said unload fixture and depositing it upon said transfer conveyor, and a hydraulic ram for moving the turntable vertically between the levels of the first conveyor and the transfer conveyor.

3. Apparatus for performing a series of machining operations upon one end of a workpiece followed by a further series of machining operations on the other end of the workpiece, comprising first and second groups of work stations arranged in a single line, first and second longitudinally aligned, continuously driven endless conveyors arranged alongside said first and second groups of work stations, respectively, for moving work holders past the work station of each group, said first and second conveyors having input and discharge ends, transfer means situated between the discharge end of the first conveyor and the input end of the second conveyor, comprising a continuously driven endless transfer conveyor parallel to said first and second conveyors, a turntable rotatable about a vertical axis between the discharge end of said first conveyor and the input end of said transfer conveyor, a gate extending across said transfer conveyor at a point intermediate its input and discharge ends pivotally mounted for movement into and out of the path of workpieces on said transfer conveyor, and hydraulic means mounted alongside of said transfer conveyor operative to remove workpieces halted by said gate for transfer to a place of storage and to return workpieces from said place of storage to said transfer conveyor.

4. Apparatus for performing a series of machining operations on one end of a workpiece followed by a further series of machining operations on the other end of the workpiece, comprising first and second groups of work stations arranged in a single line, first and second longitudinally aligned endless conveyors arranged alongside said first and second groups of work stations, respectively, for moving work holders past the work stations of each group, said first and second conveyors having input and discharge ends, transfer means located between the discharge end of the first conveyor and the input end of the second conveyor, said transfer means comprising a continuously driven endless transfer conveyor extending parallel to said first and second conveyors, a turntable rotatable about a vertical axis between the discharge end of said first conveyor and the input end of said transfer conveyor, a platform movable vertically between the levels of the transfer conveyor and said second conveyor between the output end of the transfer conveyor and a load fixture adjacent the input end of said second conveyor, and hydraulic means for transferring a workpiece from said transfer conveyor to said platform and from said platform through said load fixture into a work holder on said second conveyor.

5. Apparatus according to claim 22, wherein said turntable is rotated by a hydraulic operated rack meshing with a pinion on a rotatable support for said turntable.

6. Apparatus for performing a series of machining operations upon one end of a workpiece, followed by a further series of machining operations on the other end of the workpiece, comprising first and second groups of work stations arranged in a single file, first and second longitudinally aligned, continuously driven conveyors arranged along side said first and second groups of work stations respectively, for moving work holders past the work stations in each group, first and second continuously driven storage conveyors, arranged below the level of said first mentioned conveyors, transfer means located between the last work station in said first group and the first work station in the second group for removing workpieces from the work holders which have been moved past said first group of work stations, rotating said workpieces through 180° and transferring them to the work holders which are to be moved by the second conveyor past said second group of stations and means for feeding empty work holders from said first and second storage conveyors to said first and second conveyors respectively and returning empty workholders to said storage conveyors after use.

7. Apparatus according to claim 22, wherein said jaws are mounted on a platform movable horizontally on said turntable by a hydraulically operated pinion on said platform meshing with a longitudinally extending rack on said turntable.

* * * * *